United States Patent
Hamed et al.

(10) Patent No.: US 6,403,520 B1
(45) Date of Patent: Jun. 11, 2002

(54) CATALYST COMPOSITIONS FOR POLYMERIZING OLEFINS TO MULTIMODAL MOLECULAR WEIGHT DISTRIBUTION POLYMER, PROCESSES FOR PRODUCTION AND USE OF THE CATALYST

(75) Inventors: Orass Hamed; Akhlaq Moman; Atieh Abu-Raqabah, all of Riyadh (SA)

(73) Assignee: Saudi Basic Industries Corporation, Riyadh (SA)

( * ) Notice: Subject to any disclaimer, the term of this patent is extended or adjusted under 35 U.S.C. 154(b) by 0 days.

(21) Appl. No.: 09/399,305

(22) Filed: Sep. 17, 1999

(51) Int. Cl.$^7$ ................................. B01J 31/02
(52) U.S. Cl. .................. 502/113; 526/116; 526/119; 526/114; 502/152; 502/117; 502/102; 502/103; 502/159
(58) Field of Search ................... 526/114, 116, 526/119; 502/117, 152, 102, 103, 113, 159

(56) References Cited

U.S. PATENT DOCUMENTS

| | | | |
|---|---|---|---|
| 4,107,415 A | 8/1978 | Giannini | 526/114 |
| 4,414,369 A | 11/1983 | Kuroda et al. | 526/65 |
| 4,420,592 A | 12/1983 | Kato et al. | 526/65 |
| 4,522,982 A | 6/1985 | Ewen | 525/240 |
| 4,530,914 A | 7/1985 | Ewen et al. | 502/113 |
| 4,703,094 A | 10/1987 | Raufast | 526/65 |
| 4,937,299 A | 6/1990 | Ewen et al. | 526/119 |
| 5,070,055 A | 12/1991 | Schramm et al. | 502/107 |
| 5,183,867 A | 2/1993 | Welborn, Jr. | 526/114 |
| 5,707,914 A | 1/1998 | Kataoka et al. | 502/114 |
| 5,756,613 A | 5/1998 | Costa | 526/159 |
| 5,840,808 A | 11/1998 | Sugimura et al. | 525/268 |
| 5,882,750 A | 3/1999 | Mink et al. | 428/35.7 |
| 5,885,924 A | 3/1999 | Ward | 502/402 |

FOREIGN PATENT DOCUMENTS

WO    WO/86/03756    7/1986

OTHER PUBLICATIONS

International Search Report dated Jan. 11, 2001.
International Preliminary Examination Report dated Jul. 16, 2001.

Primary Examiner—David W. Wu
Assistant Examiner—William K Cheung
(74) Attorney, Agent, or Firm—Kramer Levin Naftalis & Frankel (57) ABSTRACT

A solid catalyst component comprises a transition metal-containing metallocene compound, a non-cyclopentadienyl transition metal compound, a magnesium compound and a polymeric material which acts as a support. The catalyst component is combined with co-catalyst organoaluminum compound or a mixture of organoaluminum compounds to provide a catalyst composition useful for olefin polymerization, e.g., to produce linear low, medium and high density polyethylenes or copolymerization of ethylene with alpha-olefins. Product polyolefin polymers have a varied range of molecular weight distributions. The catalyst composition is prepared by a process comprising combining polymer support particles, magnesium compound, transition metal-containing metallocene compound, and non-cyclopentadienyl transition metal compound to provide a solid catalyst component, and, combining the solid catalyst component with a cocatalyst compound to provide a polyolefin polymerization catalyst composition.

22 Claims, 4 Drawing Sheets

CATALYST COMPOSITIONS FOR POLYMERIZING OLEFINS TO MULTIMODAL MOLECULAR WEIGHT DISTRIBUTION POLYMER, PROCESSES FOR PRODUCTION AND USE OF THE CATALYST

BACKGROUND OF THE INVENTION

1. Field of the Invention

This invention relates to bimetallic supported olefin polymerization catalyst systems, methods of producing such catalysts and methods of polymerizing alpha-olefins with such catalysts to form polymers having multimodal or broad molecular weight distribution. More particularly, this invention relates to the preparation of a catalyst component comprising a metallocene-containing transition metal compound, a non-metallocene-containing transition metal compound, a magnesium containing compound and a polymeric material. The catalyst component is combined with a cocatalyst compound to produce a catalyst composition.

2. Description of the Prior Art

A number of methods exist for producing polymers possessing multi-modal and/or broad molecular weight distribution. U.S. Pat. No. 4,414,369 to Kuroda et al., U.S. Pat. No. 4,420,592 to Kato et al. and U.S. Pat. No. 4,703,094 to Raufaut describe processes employing two reactors operating in series, operating at significantly different hydrogen concentrations and thus producing polymer containing both high and low molecular weight polymer. Cozewith et al. in WO 86/03756 describe a melt blending technique in an extruder of polyolefins. However, these methods are an expensive, cumbersome and time consuming procedure of producing multi-modal molecular weight distribution polymer.

Alternatively, a single reactor can be used for the production of broad or multi-modal molecular weight distribution polymer by using blends of catalyst with different propagation and termination rate constants for ethylene polymerization. U.S. Pat. No. 4,530,914 describes the use of a homogeneous catalyst system consisting of two different metallocenes for the production of broad molecular weight distribution and/or multi-modal molecular weight distribution polyolefin. U.S. Pat. Nos. 4,937,299 and 4,522,982 describe using a homogeneous catalyst system containing two or more metallocenes to produce reactor blends. In further developments, U.S. Pat. Nos. 5,070,055 and 5,183,867 describe silica supported catalysts containing two different active centers.

Despite the catalyst improvements described in the aforementioned patents, the preparation of supported bimetallic catalysts is complicated and expensive, for example, requiring intermediate introduction of expensive and troublesome aluminoxanes in catalyst preparation. For example, U.S. Pat. No. 5,183,867 requires introduction of aluminoxane into the support. Any aluminum containing co-catalyst used is in addition to aluminum compound in the support. Furthermore, procedures typically used for the preparation of suitable silica supports such as spray drying or re-crystallization processes are complicated and expensive. Also, high calcination temperatures are required to remove water, which is a common catalyst poison. These steps represent a significant proportion of the preparation of the catalyst. Moreover, the use of silica as a support results in support material remaining in the polyolefin product, e.g., high ash and metal residues, which can affect product processing or product properties, such as optical properties.

In some instances, polymer supports have been used in olefin polymerization catalysts. U.S. Pat. No. 5,707,914 describes a catalyst component which includes polymer carrier, organic zirconium or hafnium compound, an organic compound containing Group I–III metal such as organoaluminum, and a cyclic organic compound containing two or more conjugated double bonds. This latter cyclic compound component has no transition metal. U.S. Pat. No. 5,707,914 describes the synthesis of a supported metallocene catatylst prepared in situ, with a formulation that consists of one active metal site (monometallic) mainly zirconium, used to produce polyethylene resin with narrow, possibly medium, molecular weight distribution. In contrast, the present invention provides a different catalyst capable of producing polyethylene with broad and bimodal molecular weight distribution. Moreover, the catalyst of the present invention has much higher activity.

An object of the present invention is to provide catalysts which overcome the difficulties encountered in the prior art.

SUMMARY OF THE INVENTION

The present invention provides a catalyst component comprising a transition metal-containing metallocene compound (referred to as the metallocene compound hereafter), a non-cyclopentadienyl transition metal compound (referred to as the transition metal compound hereafter), a magnesium compound and a polymeric material which acts as a support. The catalyst component, when used in conjunction with co-catalyst such as an organoaluminum compound or a mixture of organoaluminum compounds, can be used for ethylene polymerization to produce linear low, medium and high density polyethylenes and copolymerization of ethylene with alpha-olefins having about 3 to about 18 carbon atoms. Furthermore, the catalyst system has the ability to produce polymers with a varied range of molecular weight distributions, i.e., from narrow molecular weight distribution to a broad molecular weight distribution and/or multi modal molecular weight distribution.

In a preferred embodiment, the catalyst composition is prepared by a process comprising combining polymer particles, magnesium compound, metallocene compound, and transition metal compound to provide a solid catalyst component, and combining the solid catalyst component with a cocatalyst compound to provide a polyolefin polymerization catalyst composition.

The invention also includes processes of making and using the catalyst composition.

DETAILED DESCRIPTION OF THE INVENTION

The catalyst component of the present invention is solid. The solid catalyst component contains a metallocene compound, a transition metal compound, a magnesium compound and a polymeric material having a mean particle diameter of 5 to 1000 $\mu$m, a pore volume of 0.1 cc/g or above, a pore diameter of 500 to 10,000 Angstrom and a surface area of from 0.2 m²/gm to 15 m²/gm. The catalyst component is useful for olefin polymerization.

The transition metal compound used in the solid catalyst component of the invention is represented by the general formulas $Tm(OR^1)_nX_{4-n}$ or $Tm(R^2)_nX_{4-n}$, wherein Tm represents a transition metal of Group IVB, VB, or VIB (CAS version of the Periodic Table of the Elements), $R^1$ and $R^2$ represent an alkyl group, aryl group or cycloalkyl group having 1 to 20 carbon atoms, X represents a halogen atom and n represents a number satisfying $0 \leq n \leq 4$. Non-limiting examples of the transition metal in the transition metal compound are titanium, vanadium, or zirconium. Examples of $R^1$ include alkyl groups such as methyl, ethyl, n-propyl, isopropyl, n-butyl and the like.

Preferred non-metallocene transition metal compounds include: titanium tetrachloride, methoxy titanium trichloride, dimethoxy titanium dichloride, ethoxy titanium trichloride, diethoxy titanium dichloride, propoxy titanium trichloride, dipropoxy titanium dichloride, butoxy titanium trichloride, butoxy titanium dichloride, vanadium trichloride, vanadium tetrachloride, vanadium oxytrichloride, and zirconium tetrachloride.

At least one metallocene is used in the catalyst of the present invention. The metallocenes used can be represented by the general formula $(Cp)_zMR_wX_y$ wherein Cp represents unsubstituted or substituted cyclopentadienyl ring, M represents a Group IVB or VB transition metal, R represents a hydrocarbyl radical such as alkyl containing 1 to 20 carbon atoms, e.g., methyl, ethyl or propyl; X represents a halogen atom; and $1 \leq z \leq 3$, $0 \leq w \leq 3$, $0 \leq y \leq 3$. The cyclopentadienyl ring may be unsubstituted or substituted with a hydrocarbyl group such as alkyl, alkenyl, aryl, the hydrocarbyl group containing 1 to 20 carbon atoms; such as methyl, ethyl, propyl, amyl, isoamyl, isobutyl, phenyl and the like. The preferred transition metals for the metallocene compound are titanium, zirconium or vanadium.

Preferred metallocene compounds include bis (cyclopentadienyl)zirconium dimethyl, bis (cyclopentadienyl)zirconium methyl chloride, bis (cyclopentadienyl)zirconium ethyl chloride, bis (cyclopentadienyl)zirconium dichloride, bis (cyclopentadienyl)titanium dimethyl, bis(cyclopentadienyl) titanium methyl chloride, bis(cyclopentadienyl)titanium ethyl chloride and bis(cyclopentadienyl)titanium dichloride.

Magnesium compounds useful for catalyst composition of the invention include Grignard compounds represented by the general formula $R^3MgX$, wherein $R^3$ is a hydrocarbyl group of 1 to 20 carbon atoms and X is a halogen atom, preferably chlorine. Other preferred magnesium compounds are represented by the general formula $R^4R^5Mg$, wherein $R^4$ and $R^5$ are different or the same hydrocarbyl group of 1 to 20 carbon atoms.

Preferred magnesium compounds include dialkylmagnesium such as diethylmagnesium, dipropylmagnesium, di-iso-propylmagnesium, di-n-butylmagnesium, di-iso-butylmagnesium, butylethylmagnesium, dihexylmagnesium, dioctylmagnesium; alkyl magnesium chloride such as ethylmagnesium chloride, butylmagnesium chloride, hexylmagnesium chloride and the like.

The polymer material used in the present invention includes polymer particles which have a spherical shape with a particle diameter of 5 to 1000 μm, preferably 10 to 800 μm, and more preferably 15 to 500 μm, a pore diameter of 500 to 10,000 Angstroms and a pore volume of 0.1 cc/g or above, preferably 0.2 cc/g or above, and a surface area of from 0.2 m²/gm to 15 m²/gm.

Examples of the polymeric materials used in the catalyst of the present invention include beads of polymers such as polyvinylchloride, polyvinylalcohol, ethylene-vinylalcohol copolymer, polymethylmethacrylate, polyethylacrylate, polymethylmethacrylate, and the like. Among these polymeric materials, the vinylpolymers are preferred and polyvinylchloride is more preferred.

The polymeric materials used in the present invention have surface active sites such as labile chlorine atoms. Preferably, these active sites are reacted stoichiometrically with the organic magnesium compound. The surface active sites, for example, of the polyvinylchloride polymeric support, referred to herein as labile chloride atoms, are expected to react stoichiometrically with the magnesium compound to produce a support with a modified surface containing magnesium compound, which in turn can react actively with most of the titanium and zirconium compounds to produce a highly active catalyst.

The use of the polymer particles as catalyst supports in this invention offers significant advantages over traditional olefin polymerization catalysts using supports such as silica or magnesium chloride. In comparison to the silica supported catalyst, the polymer particles require no high temperature nor prolonged dehydration steps prior to their use in the catalyst synthesis, thereby simplifying the catalyst synthesis process and thus reducing the overall cost of catalyst preparation. Furthermore, the cost of the polymeric support used in the present invention is substantially lower than silica or magnesium chloride supports. In addition, the catalyst in the present invention uses significantly lower levels of catalyst precursors (lower metal loadings) compared to standard bimetallic silica supported catalyst systems. In a preferred embodiment the present invention can use metal loadings of, e.g., about 0.18% Ti and about 0.06% Zr, which are about ten times less than metal loadings used in standard bimetallic silica supported systems such as those described in U.S. Pat. Nos. 4,701,432 and 5,032,562 in which metal loadings of about 1.1% Ti and 0.63% Zr are used. Also, the catalyst in the present invention is more active than conventional silica or magnesium chloride supported Ziegler-Natta catalysts and some supported metallocene catalysts.

According to one embodiment, a polyvinyl chloride support is used. The synthesis of the solid catalyst component in the present invention involves introducing the polymeric material into a vessel and adding a diluent. Suitable diluents include alkanes such as isopentane, hexane, and heptane, and ethers such as diethylether and dibutylether. The polymeric material in diluent is then treated with a magnesium compound described above at a temperature in the range of about 20° C. to 110° C. The ratio of magnesium compound to the polymer support material can be in the range of 0.1 mmol to 10 mmol per gram polymer. The excess or unreacted magnesium chloride is removed by washing with suitable solvents such as hexane, heptane or isooctane.

The resulting free flowing solid product is slurried in a solvent. Suitable solvents for slurrying include hexane, cyclohexane, heptane, isooctane and pentamethylheptane. The material is treated with a transition metal compound described above at a temperature in the range of about 40° C. to about 120° C. Titanium tetrachloride, vanadium tetrachloride and zirconium tetrachloride are the preferred transition metal compounds. The transition metal treated product is washed with a suitable solvent such as isopentane, hexane, cyclohexane, heptane, isooctane and pentamethylheptane, preferably isopentane or hexane. The washed product is treated with a metallocene compound described above at a temperature in the range of about 40° C. to about 120° C. producing a solid catalyst component. Bis(cyclopentadienyl)zirconium dichloride is the preferred metallocene compound. The produced solid catalyst component is washed with a suitable solvent such as isopentane, hexane, cyclohexane, heptane, isooctane and pentamethylheptane, preferably isopentane or hexane, and dried using a nitrogen purge at a temperature in the range of about 20° C. to about 80° C.

The present invention includes a non-metallocene compound and a metallocene compound of different metals to provide a bimetallic formulation. Combinations of metals which can be used include Ti—Zr, V—Zr, Ti—V, etc. A preferred embodiment of the invention includes a Ti and Zr metal combination and preferably the final solid catalyst component has a molar ratio of Ti:Zr of about 2:1 to about 50:1, more preferably about 3:1 to about 30:1. However, it is possible to replace one metal compound, e.g., the non-metallocene compound of titanium, e.g., $TiCl_4$, with another metal compound, e.g., a non-metallocene vanadium compound, e.g., $VCl_4$ or $VOCl_3$.

The thus-formed solid catalyst component is activated with suitable activators, also known as co-catalysts, for olefin polymerization. The preferred compounds for activation of the solid catalyst component are organoaluminum compounds.

The cocatalyst is a mixture, e.g., of an activator for the titanium sites and an activator for the zirconium sites. The activator suitable for activating the titanium sites may be represented by the general formula $R^6{}_nAlX_{3-n}$, wherein $R^6$ represents a hydrocarbon group having 1 to 10 carbon atoms; X represents a halogen atom or an alkoxy group and n represents a number satisfying $0 \leq n \leq 3$. Illustrative but not limiting examples include trialkylaluminums such as trimethylaluminum, triethylaluminum (TEAL), triisobutylaluminum (TIBA), tri-n-hexylaluminum (TnHAL); dialkylaluminum chloride such as dimethylaluminum chloride, diethylaluminum chloride; alkylaluminum dichloride such as methylaluminum dichloride, ethylaluminum dichloride; dialkylaluminum methoxide such as dimethylaluminum methoxide, diethylaluminum ethoxide. The preferred activators for the titanium sites are trimethylaluminum, triethylaluminum, triisobutylaluminum and tri-n-hexylaluminum.

The zirconium sites activator is an aluminoxane represented by the general formula in the case of the linear aluminoxane, where q represents a number satisfying $0 \leq q \leq 50$ and/or for a cyclic aluminoxane, wherein s represents a number satisfying $3 \leq s \leq 50$, wherein $R^7$, $R^8$, $R^9$ and $R^{10}$ are either the same or different linear, branched or cyclic alkyl group of 1 to 12 carbons, such as methyl, ethyl, propyl or isobutyl. The most preferred activator for the zirconium sites is methylaluminoxane. Since commercially produced methylaluminoxane contains trimethylaluminum; commercially produced methylaluminoxane can itself be conveniently used to activate both the titanium and the zirconium sites.

The organoaluminum compound or organoalunminum compounds in this invention can be used in the range of about 1 to 1500 moles of aluminum per one mole of transition metal in the said catalyst, and more preferably in the range of about 50 to 800 moles aluminum per one mole of transition metal.

The catalyst systems of the present invention are of high activity of at least about 10 to 80 kilograms of polymer produced per mmol metal. The gel permeation chromatography of the polymers produced by the catalyst systems of this invention shows a broad and bimodal molecular weight distribution. In addition, the use of the catalyst composition of the invention produces polymer product with very low ash and low metal residues. The standard bimetallic catalysts of the prior art which use silica as a support include ash in higher ppm levels in product bimodal polymers because silicon in the support contributes to ash as a metal residue. In contrast, the catalyst of the invention uses polymeric support such as PVC which does not contribute to ash reading. Also, the use of lower metal loadings possible in the present invention helps in reducing the overall ash content which can result from residual active metals, e.g., Ti, Zr, etc.

The linear polyethylene polymers prepared by the use of the catalyst systems of this invention are homopolymers of ethylene or copolymers of ethylene with one or more $C_3$–$C_{10}$ alpha-olefins. Particular examples of these copolymers include ethylene/1-butene copolymers, ethylene/1-hexene copolymers, ethylene/1-octene copolymers, ethylene 4-methyl-1-pentene copolymers. Ethylene/1-hexene and ethylene/1-butene are the most preferred copolymers polymerized with the catalyst systems of this invention.

EXAMPLES

The following examples are intended to be illustrative of this invention. They are, of course, not to be considered in any way limiting on the scope of this invention. Numerous changes and modifications can be made with respect to the invention without departing from the spirit of the invention.

Example 1

Synthesis of Butyl Magnesium Chloride (Grignard Reagent)

A three-necked round bottom flask, equipped with a nitrogen inlet, a thermometer, a reflux condenser and a dropping funnel, was purged with nitrogen for 30 minutes at 110° C. and 12 g of magnesium turnings were added to the flask. A crystal of iodine was added, followed by 255 cc dibutylether. Then 53.0 cc of butylchloride was gradually added to the flask over a period of 45 minutes, while stirring and maintaining the temperature at 105° C. The resulting mixture in the flask was stirred for 90 minutes after the completion of butylchloride addition at 105° C. Then 400 cc of n-heptane was added and stirring was carried out for a further 90 minutes at 105° C. The reaction mixture was cooled to room temperature, and the solid matter was filtered off.

A sample of the butylmagnesium chloride solution was analyzed using a Mettler Autotitrator and the concentration of n-butylmagnesium chloride was determined to be 0.68 M.

Synthesis of Catalyst A

To a three-necked round bottom flask, equipped with a condenser and stirrer, was added 5.0 g of polyvinylchloride spheres of 50 μm average particle size (supplied by SABIC, Saudi Arabia). The flask containing the polyvinylchloride was heated to 75° C. using an oil bath and evacuated at 30 mm Hg pressure for 30 minutes. The flask and its contents were purged with dried nitrogen and the polyvinylchloride was slurried using 30 cc of n-hexane. Three cc's of butylmagnesium chloride were added to the slurry at 75° C. and the resultant mixture was stirred for 30 minutes at 75° C. The stirring was stopped and the supernatant liquid was removed by cannula. The resulting solid was washed by stirring with 50 cc of n-hexane, removing the solvent by cannula, and repeating the washing step with a further 50 cc of n-hexane to provide modified polyvinylchloride.

The modified polyvinylchloride was slurried using 30 cc of n-hexane, and stirred with 1 cc of a one molar titanium tetrachloride solution in n-hexane at 75° C. for 7 minutes. The supernatant liquid was decanted and the resulting solid product was washed by stirring with 50 cc of n-hexane, removing the n-hexane, and washing again with 50 cc of n-hexane. The treated polyvinyl chloride was slurried using 20 cc of n-hexane, and stirred with zirconocene dichloride solution (0.12 g of $Cp_2ZrCl_2$ in 10 cc diethylether and 15 cc toluene) for 60 minutes at 75° C. The stirring was stopped and the supernatant liquid was removed by cannula The resulting solid was washed by stirring with 50 cc of n-hexane and then washed again with a further 50 cc of n-hexane. Finally, the solid catalyst was dried using a nitrogen purge for thirty minutes to yield a free-flowing pale brown colored solid product. The solid catalyst component was analyzed by atomic adsorption spectroscopy and was found to contain 0.16% by weight of titanium atoms, 0.06% by weight of zirconium atoms and 0.3% by weight of magnesium atoms.

Example 2

Synthesis of Catalyst B

To a three-necked round bottom flask, equipped with a condenser and stirrer, were added 6.6 g of polyvinylchloride spheres of 50 μm average particle size (supplied by SABIC, Saudi Arabia). The flask containing the polyvinylchloride was heated to 75° C. using an oil bath and then evacuated at 30 mm Hg pressure for 30 minutes. The flask and its contents were then purged with dried nitrogen and the polyvinylchloride was slurried using 30 cc of n-hexane. Then 3 cc of butylmagnesium chloride was added to the slurry at 75° C. and the resultant mixture was stirred for 30 minutes at 75° C. The stirring was stopped and the supernatant liquid was removed by cannula. The resulting solid was washed once by stirring with 50 cc of n-hexane and then removing the solvent by cannula to provide modified polyvinylchloride.

The modified polyvinylchloride was slurried using 15 cc of n-hexane, and then stirred with zirconocene dichloride solution (0.12 g of $CP_2ZrCl_2$ in 10 cc diethylether and 15 cc toluene) for 70 minutes at 70° C. The stirring was continued and the slurry was treated with 3 cc of a one molar titanium tetrachloride solution in n-hexane at 75° C. for 20 minutes. The supernatant liquid was decanted and the resulting solid product was washed twice by stirring with 50 cc of n-hexane and then removing the n-hexane.

Finally, the solid catalyst was dried under nitrogen purge and vacuum alternatively for thirty minutes to yield a free-flowing pale brown colored solid product. The solid catalyst component was found to contain 0.3% by weight of titanium atoms, 0.03% by weight of zirconium atoms and 0.25% by weight of magnesium atoms.

Example 3

Synthesis of Catalyst C

To a three-necked round bottom flask, equipped with a condenser and stirrer, was added 6.6 g of polyvinylchloride spheres of 50 μm average particle size (supplied by SABIC, Saudi Arabia). The flask containing the polyvinylchloride was heated to 75° C. using an oil bath and evacuated at 30 mm Hg pressure for 30 minutes. The flask and its contents were purged with dried nitrogen and the polyvinylchloride was slurried using 30 cc of n-hexane. Then 3 cc of butylmagnesium chloride was added to the slurry at 75° C. and the resultant mixture was stirred for 30 minutes at 75° C. The stirring was then stopped and the supernatant liquid was removed by cannula. The resulting solid was washed once by stirring with 50 cc of n-hexane and removing the solvent by cannula to provide modified polyvinylchloride.

The modified polyvinylchloride was slurried using 30 cc of n-hexane, and stirred with 1 cc of a one molar titanium tetrachloride solution in n-hexane at 75° C. for 5 minutes. The supernatant liquid was decanted and the resulting solid product was washed once by stirring with 50 cc of n-hexane and removing the n-hexane to provide treated polyvinylchloride.

The treated polyvinylchloride was slurried using 20 cc of n-hexane, and stirred with zirconocene dichloride solution (0.14 g of $Cp_2ZrCl_2$ in 15 cc diethylether and 22 cc toluene) for 60 minutes at 75° C. The stirring was stopped and the supernatant liquid was removed by cannula. Finally, the solid catalyst was dried without washing using a nitrogen purge and vacuum alternatively for thirty minutes to yield a free-flowing pale brown colored solid product. The solid catalyst component was found to contain 0.17% by weight of titanium atoms, 0.05% by weight of zirconium atoms and 0.3% by weight of magnesium atoms.

Example 4

Ethylene Homopolymerization

An autoclave with a volume of 2 liters was purged with nitrogen at 130° C. for 30 minutes. After cooling the autoclave to 80° C., one liter of n-hexane was introduced to the reactor, the reactor was pressurized with 1.8 bar hydrogen followed by pressurizing the reactor to 15 bar with ethylene. Then a mixture of 1.5 cc of MMAO (methylaluminoxane) solution (7 wt % Al) and 1.5 cc of 1M TnHAL were injected into the reactor by means of a catalyst injection pump. This was followed by injection of 0.125 g of the solid catalyst A prepared in Example 1 slurried in 20 cc of n-hexane solvent. The reactor temperature was raised to 85 C. Ethylene polymerization was carried out for 1 hour; with ethylene supplied on demand to maintain the total reactor pressure at 1.5 bar and 88 grams of polyethylene were recovered.

Figure 1:
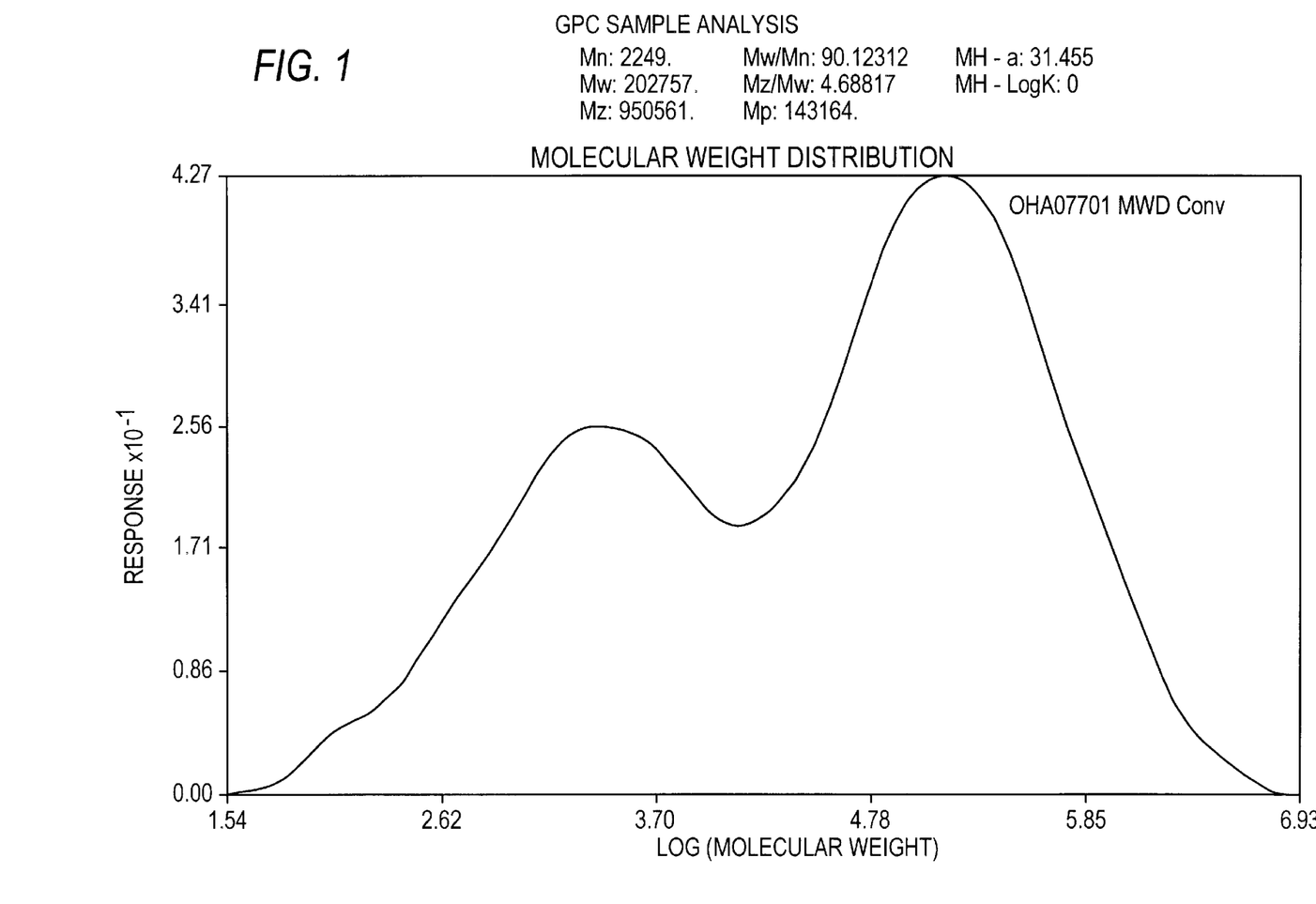
FIG. 1 is a graph showing the molecular weight distribution of polymer produced in Example 4.

The product polyethylene was examined by GPC and was found to have a weight average molecular weight of 202,757, a number average molecular weight of 2,249 and a broad molecular weight distribution (MWD) of 90.1. The MWD curve of the polymer showed that the polymer had a bimodal MWD as shown in FIG. 1.

Two melting points peaks were shown on the DSC thermogram; with one at 120.8° C. and the other at 136.6° C. The average rate of polymerization was calculated by dividing the yield of polymer by the total mmoles of transition metal contained in the catalyst by the time in hours.

Average rate of Polymerization=88 g/0.00585 mmol×1 hr=7.917 g PE/mmol M h, at 100 psig Example 5

Ethylene Homopolymerization

A 2 liter autoclave was purged with nitrogen at 130° C. for 30 minutes. After cooling the autoclave to 80° C., one liter of n-hexane was introduced to the reactor, then the reactor was pressurized with 2.3 bar hydrogen followed by pressurizing the reactor to 15 bar with ethylene. Then a mixture of 1.6 cc of M-MAO solution (7 wt % Al) and 1.6 cc of 1M TnHAL were injected into the reactor by means of a catalyst injection pump. This was followed by injection of 0.2 g of the solid catalyst A prepared in Example 1 slurried in 20 cc of n-hexane solvent.

The reactor temperature was raised to 85° C. Ethylene polymerization was carried out for 1 hour; with ethylene supplied on demand to maintain the total reactor pressure at 15 bar and 112 grams of polyethylene were recovered.

Figure 2:
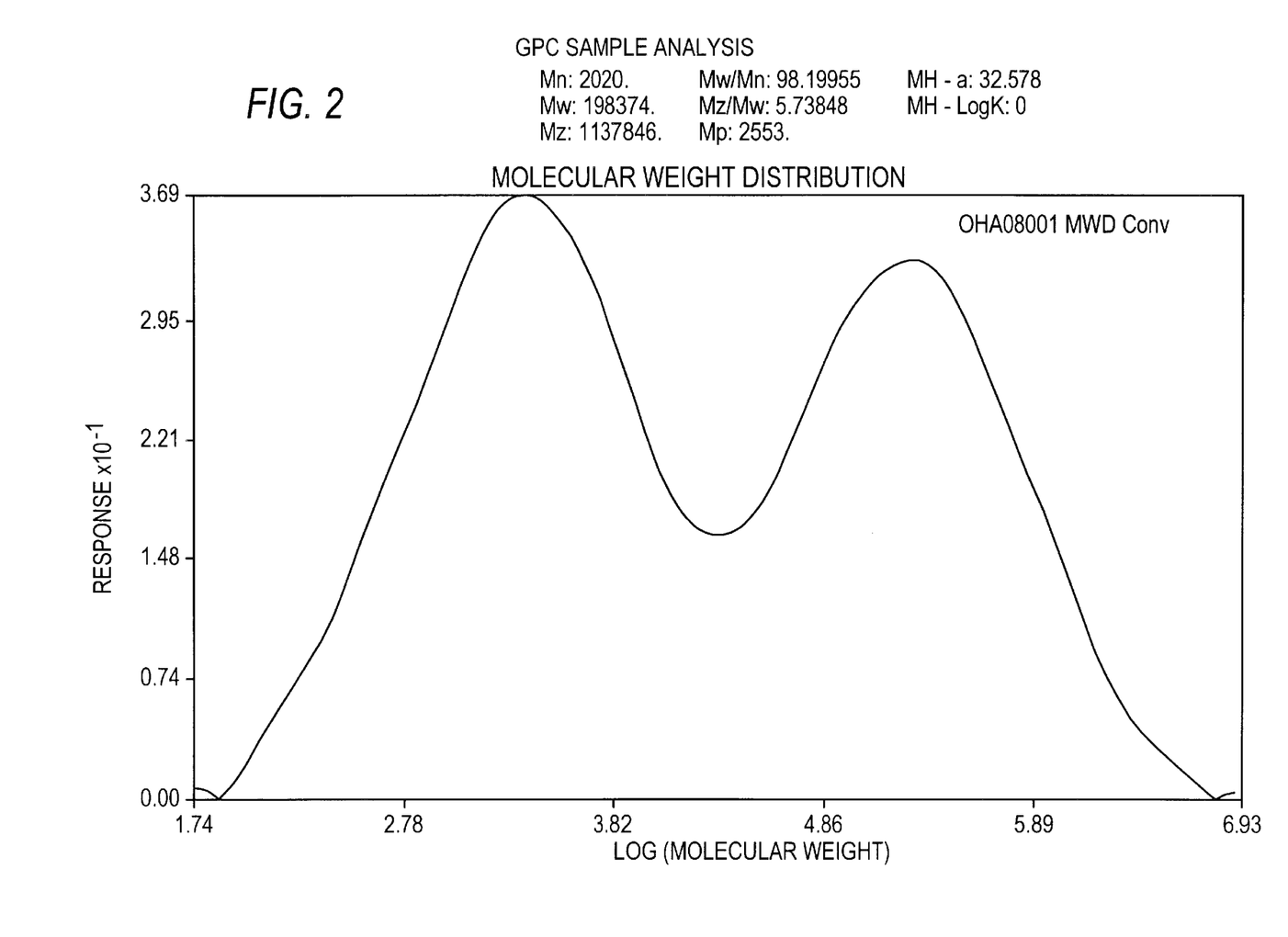
FIG. 2 is a graph showing the molecular weight distribution of polymer produced in Example 5.

The polyethylene was examined by GPC and was found to have a weight average molecular weight of 198,374, a number average molecular weight of 2,020 and a very broad molecular weight distribution of 98.2. The MWD curve of the polymer showed that the polymer had a bimodal MWD, as shown in FIG. 2.

Two melting points peaks were shown on the DSC thermogram, with one at 120.9° C. and the other at 136.7° C. The average rate of polymerization was calculated to be 7,825 g PE/mmol M h at 100 psig.

Example 6
Ethylene Homopolymerization

A 2 liter autoclave was purged with nitrogen at 130° C. for 30 minutes. After cooling the autoclave to 80° C., one liter of iso-octane was introduced to the reactor, then the reactor was pressurized with 0.5 bar hydrogen followed by pressurizing the reactor to 15 bar with ethylene. Then a mixture of 1.0 cc of M-MAO solution (7 wt % Al) and 1.0 cc of 1M TnHAL were injected into the reactor by means of a catalyst injection pump. This was followed by injection of 0.15 g of the solid catalyst B prepared in Example 2 slurried in 20 cc of n-hexane solvent. The reactor temperature was raised to 85° C.

Ethylene polymerization was carried out for 1 hour; with ethylene supplied on demand to maintain the total reactor pressure at 15 bar and 125 grams of polyethylene were recovered.

Figure 3:
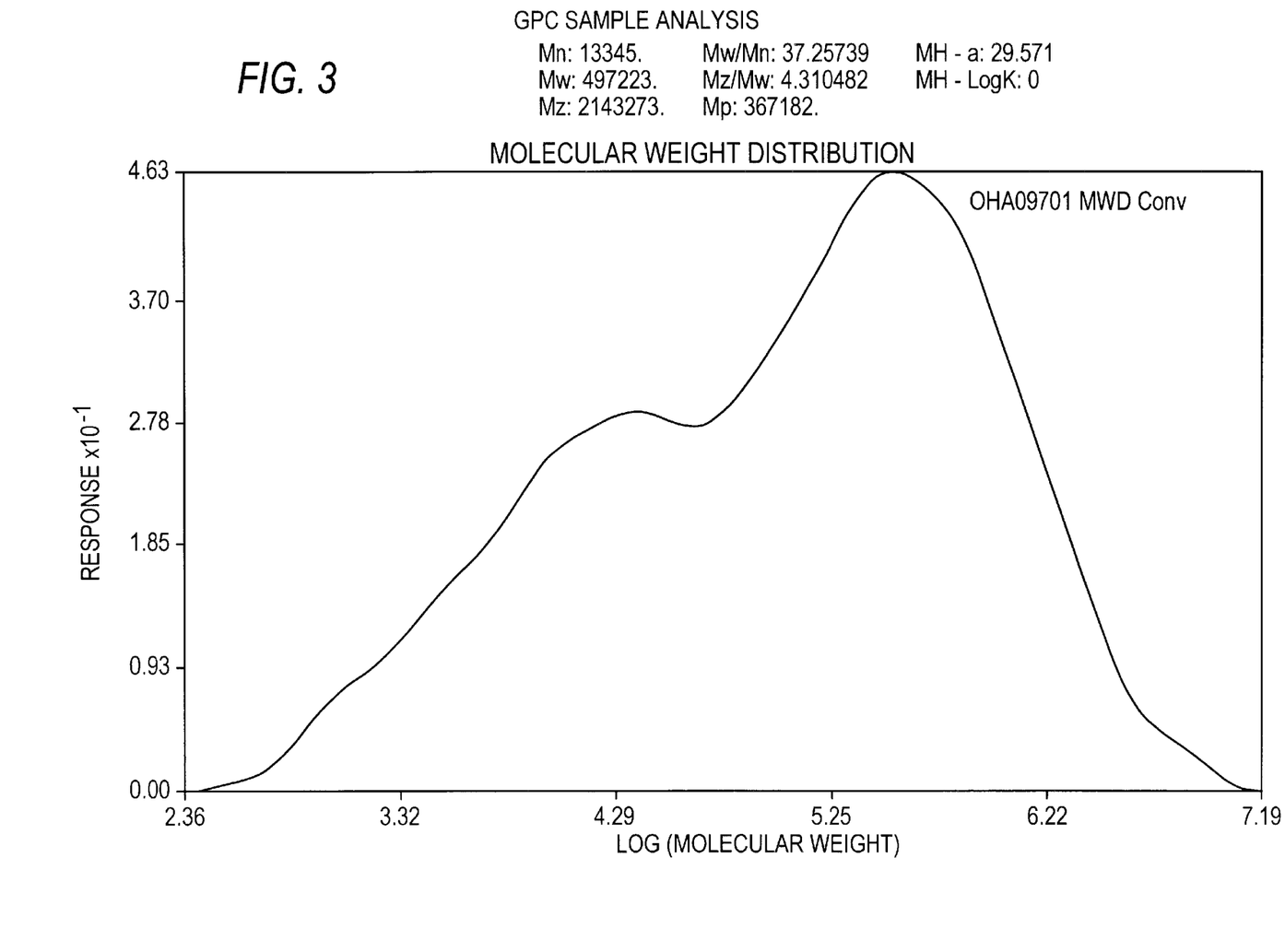
FIG. 3 is a graph showing the molecular weight distribution of polymer produced in Example 6.

The polyethylene was examined by GPC and was found to have a weight average molecular weight of 497,223, a number average molecular weight of 13,345 and a broad molecular weight distribution of 37.2. The MWD curve of the polymer showed that the polymer had a bimodal MWD, as shown in FIG. 3.

Two melting points showed on the DSC thermogram, with one at 126.6° C. and the other at 139.1 C. The average rate of polymerization was calculated to be 6,103 g PE/mmol M h at 100 psig.

Example 7
Ethylene Homopolymerization

A 2 liter autoclave was purged with nitrogen at 130° C. for 30 minutes. After cooling the autoclave to 80 C., one liter of iso-octane was introduced to the reactor and the reactor was pressurized with 0.5 bar hydrogen followed by pressurizing the reactor with 15 bar of ethylene. Then a mixture of 1.1 cc of M-MAO solution (7 wt % Al) and 1.0 cc of 1M TIBA were injected into the reactor by means of a catalyst injection pump. This was followed by injecting 0.15 g of the solid catalyst B prepared in Example 2 slurried in 20 cc of n-hexane solvent. The reactor temperature was raised to 85° C. Ethylene polymerization was carried out for 1 hour with ethylene supplied on demand to maintain the total reactor pressure at 15 bar and 125.9 grams of polyethylene were recovered.

Figure 4:
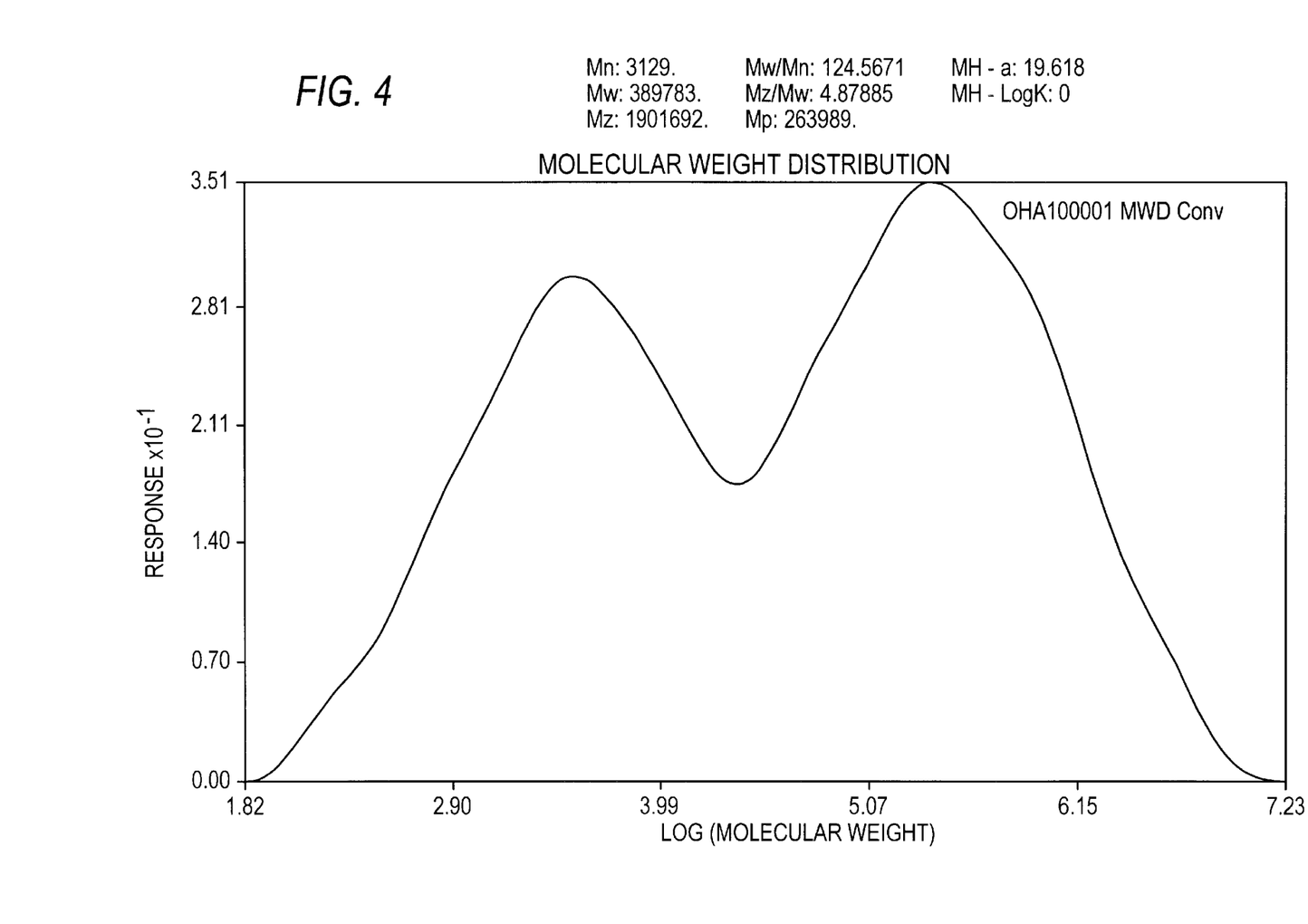
FIG. 4 is a graph showing the molecular weight distribution of polymer produced in Example 7.

The polyethylene was examined by GPC and was round to have a weight average molecular weight of 389,783, a number average molecular weight of 3,129 and a very broad molecular weight distribution of 124.6. The MWD curve of the polymer showed that the polymer had a bimodal MWD, as shown in FIG. 4.

Two melting points showed on the DSC thermogram, with one at 127.6° C. and the other at 139.1° C. The average rate of polymerization was calculated to be 9,126 g PE/mmol M h at 100 psig.

Example 8
Ethylene Homopolymerization

A 2 liter autoclave was purged with nitrogen at 130 C. for 30 minutes. After cooling the autoclave to 80° C., one liter of n-hexane was introduced to the reactor and the reactor was pressurized with 0.5 bar hydrogen followed by pressurizing the reactor with 15 bar of ethylene. Then a mixture of 0.9 cc of M-MAO solution (7 wt % Al) and 1.0 cc of 1M TEAL were injected into the reactor by means of a catalyst injection pump. This was followed by injection of 0.2 g of the solid catalyst C prepared in Example 3 slurried in 20 cc of n-hexane solvent. The reactor temperature was raised to 85° C.

Ethylene polymerization was carried out for 1 hour with ethylene supplied on demand to maintain the total reactor pressure at 15 bar and 331.5 grams of polyethylene were recovered.

The polyethylene was examined by GPC and was found to have a weight average molecular weight of 222,714 and a number average molecular weight of 7,572 and a broad molecular weight distribution of 29.4. Two melting points showed on the DSC thermogram, with one at 130.1° C. and the other at 140.7° C. The average rate of polymerization was calculated to be 18,826 g PE/mmol M h at 100 psig.

Example 9
Ethylene/1-Hexene Co-polymerization

A 2 liter autoclave was purged with nitrogen at 130° C. for 30 minutes. After cooling the autoclave to 80° C., one liter of n-hexane was introduced to the reactor and the reactor was pressurized with 0.5 bar hydrogen followed by pressurizing the reactor to 15 bar with ethylene. Two cc of M-MAO solution (7 wt %Al) was injected into the reactor by means of a catalyst injection pump, followed by injection 15 cc of 1-hexene comonomer.

This was followed by injection of 0.2 g of the solid catalyst C prepared in Example 3 slurried in 20 cc of n-hexane solvent. The reactor temperature was raised to 85° C. Ethylene polymerization was carried out for 1 hour with ethylene supplied on demand to maintain the total reactor pressure at 15 bar and 396 grams of polyethylene were recovered.

The copolymer was examined by GPC and was found to have a weight average molecular weight of 141,471, a number average molecular weight of 7,572 and a broad molecular weight distribution of 18.3. Two melting points showed on the DSC thermogram, with one at 127.4° C. and the other at 139.6° C. The average rate of polymerization was calculated to be 29,149 g PE/mmol M h at 100 psig.

These results are superior to results obtained in the prior art for supported bi-transition metal catalysts. For example, U.S. Pat. No. 5,183,867 shows a maximum catalyst activity of 2960 g PE/g M Hr in its preferred embodiments illustrated, e.g., in Example 3 of the 5,183,867 patent.

Meanwhile, the present invention attained a minimum average rate of polymerization of 6,103 g PE/mmolM h at 100 psi in Example 6. Additional results in Examples 7 show 9,126 PE/mmolM h at 100 psi. Example 8 shows 18,826 g PE/mmolM h at 100 psi. Example 9 shows 29,149 g PE/mmolM h at 100 psi.

In comparing the activities of the catalysts of the invention with catalysts described in U.S. Pat. No. 5,707,914, the activities can be reported as grams polyethylene per mmol metal as in U.S. Pat. No. 5,707,914. The results in the invention would then be 320,000 g PE/g metal in Example 4, over half a million grams polyethylene/gram metal (521,052 g PE/g metal) in Example 9. This shows catalyst activity in the present invention to be at least 10 times more active than catalysts described in U.S. Pat. No. 5,707,914.

What is claimed is:

1. A catalyst composition for polyolefin production comprising:

(A) a solid catalyst component comprising a transition metal-containing metallocene compound, a transition metal-containing non-metallocene compound, a magnesium compound and a polymeric material, and (B) a cocatalyst comprising an aluminum compound.

2. The catalyst composition of claim 1 produced by a process comprising:

combining polymer particles, magnesium compound, transition metal-containing metallocene compound and transition metal-containing non-metallocene compound to provide a a solid catalyst component; and combining the solid catalyst component with cocatalyst compound to provide a catalyst composition.

3. The catalyst composition of claim 1 wherein the production of olefins comprises homopolymerization of olefins and copolymerization of olefins with alpha-olefins.

4. The catalyst composition of claim 1 wherein the metallocene compound is represented by the general formula $(Cp)_z MR_w X_y$ wherein Cp represents unsubstituted or substituted cyclopentadienyl ring, M represents a Group IVB or VB transition metal, R represents a hydrocarbyl group containing 1 to 20 carbon atoms, X represents a halogen atom, and $1 \leq z \leq 3$, $0 \leq w \leq 3$, $0 \leq y \leq 3$.

5. The catalyst composition of claim 1 wherein the transition metal comprises titanium, zirconium or vanadium.

6. The catalyst composition of claim 4 wherein the metallocene compound is bis(cyclopentadienyl)zirconium methyl chloride, bis(cyclopentadienyl)zirconium dichloride, bis(cyclopentadienyl)titanium methyl chloride or bis(cyclopentadienyl)titanium dichloride.

7. The catalyst composition of claim 4 wherein the cyclopentadienyl ring is substituted with a hydrocarbyl group of alkyl, alkenyl or aryl, said hydrocarbyl group containing 1 to 20 carbon atoms.

8. The catalyst composition of claim 7 wherein the hydrocarbyl group comprises methyl, ethyl, propyl, amyl, isoamyl, isobutyl or phenyl.

9. The catalyst composition of claim 6 wherein the non-metallocene compound comprises titanium tetrachloride, zirconium tetrachloride and/or vanadium tetrachloride.

10. The catalyst composition of claim 1 wherein the polymeric material is comprised of particles having a mean particle diameter of 5 μm to 1000 μm, a pore volume of at least 0.1 cm$^3$/g and a surface area of from 0.2 m$^2$/g to 15 m$^2$/g.

11. The catalyst composition of claim 10 wherein the polymer particles comprise polyolefins, polyvinylchloride, polyvinylalcohol or polycarbonate.

12. A catalyst composition for polyolefin production comprising:

(A) a solid catalyst component comprising a transition metal-containing metallocene compound, a transition metal-containing non-metallocene compound, a magnesium compound and polymeric particles comprised of polyvinylchloride having a mean particle diameter of 5 μm to 1000 μm, a pore volume of at least 0.1 cm$^3$/g and a surface area of from 0.2 m$^2$/g to 15 m$^2$/g, and (B) a cocatalyst comprising an aluminum compound.

13. The catalyst composition of claim 12 wherein the polyvinylchloride particles are spherical in shape.

14. The catalyst composition of claim 9 wherein Ti and Zr are present in the composition in a molar ratio of Ti to Zr of about 3:1 to about 30:1.

15. The catalyst composition of claim 1 wherein the magnesium compound comprises a reagent with a chemical formula $R_a MgX_{2-a}$ wherein R is a hydrocarbyl group having 1 to 20 carbon atoms, X is a halogen or an alkyl group and a is 0, 1, or 2.

16. The catalyst composition of claim 15 wherein the magnesium compound comprises diethylmagnesium, dibutylmagnesium, butylethylmagnesium, dihexylmagnesium, butyloctylmagnesium, ethylmagnesium chloride, butylmagnesium chloride, hexylmagnesium chloride or mixtures thereof.

17. The catalyst composition of claim 1 wherein the cocatalyst (B) aluminum compound is represented by the general formulas $R^6{}_n AlX_{3-n}$, and $R^7 R^8 Al\text{—}O\text{—}AlR^9{}_2$, wherein $R^6$, $R^7$, $R^8$ and $R^9$ each independently represent a hydrocarbyl group having 1 to 10 carbon atoms; X represents a halogen atom and n represents a number satisfying $0 \leq n \leq 3$.

18. The catalyst composition of claim 17 wherein the cocatalyst (B) aluminum compound comprises a mixture of trialkylaluminum and an alkyl alumoxane.

19. The catalyst composition of claim 18 wherein the trialkylaluminum is trimethylaluminum, triethylaluminum, triisobutylaluminum or tri n-hexylaluminum.

20. The catalyst composition claim 18 wherein the alkyl alumoxane is methyl aluminoxane or modified methyl aluminoxane.

21. The catalyst composition of claim 1 wherein the non-metallocene compound comprises titanium tetrachloride, zirconium tetrachloride and/or vanadium tetrachloride and cocatalyst (B) contains an amount of said aluminum compound whereby the ratio of moles of aluminum in the cocatalyst to moles of titanium in the solid catalyst component is about 1 to 1500 moles of aluminum per mole of Ti.

22. The catalyst composition of claim 3 wherein the alpha-olefins are propylene, 1-butene, 1-pentene, 1-hexene, 1-heptene or 1-octene or mixtures thereof.

* * * * *